United States Patent Office 3,039,994
Patented June 19, 1962

3,039,994
POLYESTERS OF HYDROXYBENZOIC ACIDS
William K. T. Gleim, Island Lake, Ill., assignor to Universal Oil Products Company, Des Plaines, Ill., a corporation of Delaware
No Drawing. Filed May 11, 1960, Ser. No. 28,234
13 Claims. (Cl. 260—47)

This application relates to a method for the production of polymeric products, and more particularly to a method for the polymerization of hydroxy benzoic acid and substituted hydroxy benzoic acids.

It has now been discovered that polymeric products possessing unusually high melting points may be prepared by polymerizing hydroxy benzoic acid and substituted hydroxy benzoic acids. The polymers thus prepared which, as hereinbefore set forth, possess relatively high melting points are useful for a wide variety of purposes. For example, they may be used for preparing products which may be called upon to withstand relatively high temperatures. The products obtained by the polymerization process of the present invention, that is, by polymerizing hydroxy benzoic acid and substituted hydroxy benzoic acids will have melting points of above 400° C. and, in addition, said products will be insoluble in many organic solvents such as dimethylsulfoxide, guaiacol, dibutyl phthalate, dimethylformamide, etc.

It is therefore an object of this invention to provide a process for the production of high melting point polymeric products.

A further object of this invention is to provide a process for the polymerization of hydroxy benzoic acid and substituted hydroxy benzoic acids to prepare polymeric products.

One embodiment of this invention is found in a process for the production of a polymeric product which comprises polymerizing an organic acid selected from the group consisting of hydroxy benzoic acid and substituted hydroxy benzoic acids in an organic compound which acts simultaneously as a polymerization catalyst and a solvent at polymerization conditions to form the desired polymeric product.

A further embodiment of this invention resides in a process for the production of a polymeric product which comprises polymerizing an organic acid selected from the group consisting of hydroxy benzoic acid and substituted hydroxy benzoic acids in a tertiary amine having a boiling point greater than 150° C. which acts simultaneously as a polymerization catalyst and a solvent at polymerization conditions to form the desired polymeric product.

Yet another embodiment of the invention resides in a process for the production of a polymeric product which comprises polymerizing the methyl ester of p-acetoxy benzoic acid in the presence of a tertiary amine having a boiling point greater than 150° C., said amine acting simultaneously as a polymerization catalyst and a solvent at a temperature in the range of from about 150° to about 300° C. to form the desired polymeric product.

A specific embodiment of the invention resides in a process for the production of a polymeric product which comprises polymerizing the methyl ester of p-acetoxy benzoic acid in tri-N-butylamine at a temperature in the range of from about 200° to about 225° C. to form the desired polymeric product.

Other objects and embodiments referring to alternative substituted hydroxy benzoic acid, solvents which act simultaneously as polymerization catalysts and organic diluents or solvents will be found in the following further detailed description of the invention.

As hereinbefore set forth it has now been discovered that unusually high melting polymeric products may be obtained by polymerizing hydroxy benzoic acid at an elevated temperature in the presence of an organic solvent which acts simultaneously as a polymerization catalyst. The starting material for this process will comprise the acetylated ester of hydroxy benzoic acids such as p-hydroxy benzoic acid, m-hydroxy benzoic acid, or o-hydroxy benzoic acid. The desired hydroxy benzoic acid is then converted to the desired material for polymerization by any means known in the art depending upon the particular ester which is used. For example, p-hydroxy benzoic acid is acetylated to form p-acetoxy benzoic acid. Following this the latter product may then be converted to the methyl ester thereof by any means well known in the art and thereafter polymerized by heating to an elevated temperature in a solvent which acts simultaneously as a polymerization catalyst. In the example hereinabove set forth which is the polymerization of the methyl ester of acetoxy benzoic acid, methyl acetate is formed, which is subsequently distilled off during the polymerization reaction and may be recovered and reused. This recovery of a portion of the starting material may also be used with other esters of the hydroxy benzoic acid.

Examples of esters of acetoxy benzoic acids which may be used in the process of this invention include the methyl ester of p-acetoxy benzoic acid,
the methyl ester of o-acetoxy benzoic acid,
the methyl ester of m-acetoxy benzoic acid,
the ethyl ester of p-acetoxy benzoic acid,
the ethyl ester of o-acetoxy benzoic acid,
the ethyl ester of m-acetoxy benzoic acid,
the propyl ester of p-acetoxy benzoic acid,
the propyl ester of o-acetoxy benzoic acid,
the propyl ester of m-acetoxy benzoic acid,
the butyl ester of p-acetoxy benzoic acid,
the butyl ester of o-acetoxy benzoic acid,
the butyl ester of m-acetoxy benzoic acid,
the methyl esters of
2-chloro-p-acetoxy benzoic acid,
3-chloro-p-acetoxy benzoic acid,
2,3-dichloro-p-acetoxy benzoic acid,
2,5-dichloro-p-acetoxy benzoic acid,
2,6-dichloro-p-acetoxy benzoic acid,
2,3,5-trichloro-p-acetoxy benzoic acid,
2,3,5,6-tetrachloro-p-acetoxy benzoic acid (tetrachloro-p-acetoxy methylbenzoate),
2-fluoro-p-acetoxy benzoic acid,
3-fluoro-p-acetoxy benzoic acid,
2,3-difluoro-p-acetoxy benzoic acid,
2,5-difluoro-p-acetoxy benzoic acid,
2,6-difluoro-p-acetoxy benzoic acid,
2,3,5-trifluoro-p-acetoxy benzoic acid,
2,3,5,6-tetrafluoro-p-acetoxy benzoic acid (tetrafluoro-p-acetoxy methylbenzoate),
2-chloro-m-acetoxy benzoic acid,
2,4-dichloro-m-acetoxy benzoic acid,
2,5-dichloro-m-acetoxy benzoic acid,
2,6-dichloro-m-acetoxy benzoic acid,
2,4,5-trichloro-m-acetoxy benzoic acid,
2,4,5,6-tetrachloro-m-acetoxy benzoic acid,
2-fluoro-m-acetoxy benzoic acid,
2,4-difluoro-m-acetoxy benzoic acid,
2,5-difluoro-m-acetoxy benzoic acid,
2,5-difluoro-m-acetoxy benzoic acid,
2,4,5-trifluoro-m-acetoxy benzoic acid,
2,4,5,6-tetrafluoro-m-acetoxy benzoic acid, etc.,
3-chloro-o-acetoxy benzoic acid,
4-chloro-o-acetoxy benzoic acid,
5-chloro-o-acetoxy benzoic acid,
6-chloro-o-acetoxy benzoic acid,
3,4-dichloro-o-acetoxy benzoic acid,
3,5-dichloro-o-acetoxy benzoic acid,
3,6-dichloro-o-acetoxy benzoic acid, 3,4,5-trichloro-o-acetoxy benzoic acid,
3,4,6-trichloro-o-acetoxy benzoic acid,
4,5,6-trichloro-o-acetoxy benzoic acid,
3,4,5,6-tetrachloro-o-acetoxy benzoic acid,
3-fluoro-o-acetoxy benzoic acid,
4-fluoro-o-acetoxy benzoic acid,
5-fluoro-o-acetoxy benzoic acid,
6-fluoro-o-acetoxy benzoic acid,
3,4-difluoro-o-acetoxy benzoic acid,
3,5-difluoro-o-acetoxy benzoic acid,
3,6-difluoro-o-acetoxy benzoic acid,
3,4,5-trifluoro-o-acetoxy benzoic acid,
3,4,6-trifluoro-o-acetoxy benzoic acid,
4,5,6-trichloro-o-acetoxy benzoic acid,
3,4,5,6-tetrafluoro-o-acetoxy benzoic acid, etc.

It is to be understood that the aforementioned substituted hydroxy benzoic acids are only representatives of the class of compounds which may be used and that the present invention is not necessarily limited thereto.

The polymerization of the above mentioned esters of benzoic acids or substituted hydroxy benzoic acids is effected in a solvent which acts simultaneously as a polymerization catalyst, said catalyst being basic in nature. Examples of simultaneously acting polymerization catalysts and solvents which may be used include tertiary amines with a boiling point of at least 150° C., and preferably greater than 150° C., for instance tertiary aliphatic amines such as tri-N-propyl amine, tri-N-butyl, amine, tri-N-pentyl amine, etc., tertiary aryl amines such as N,N-dimethyl aniline, N,N-diethyl aniline, N,N-dipropyl aniline, N,N-dimethyl-o-toluidine, N,N-dimethyl-m-toluidine, N,N-dimethyl-p-toluidine, N,N-diethyl-o-toluidine, N,N-diethyl-m-toluidine, N,N-diethyl-p-toluidine, N,N-dipropyl-o-toluidine, N,N-dipropyl-m-toluidine, N,N-dipropyl-p-toluidine, N,N-dimethyl-o-xylidine, N,N-dimethyl-m-xylidine, N,N-dimethyl-p-xylidine, N,N-diethyl-o-xylidine, N,N-dimethylnaphthylamine, N,N-diethylnaphthylamine, etc. As in the case of the hydroxy benzoic acids or substituted hydroxy benzoic acids the aforementioned tertiary amines having a boiling point greater than 150° C. and which act simultaneously as both a polymerization catalyst and a solvent, said compounds being basic in nature, are only representatives of the class of compounds which may be used and the present invention is not necessarily limited thereto.

The reaction is effected at an elevated temperature in the range of from about 150° to about 300° C. The temperature will, of necessity, be dependent upon the particular reactant and the organic compound hereinbefore set forth which acts simultaneously as a polymerization catalyst and a solvent. When tri-N-butyl amine is utilized as the catalytic agent and the solvent the reaction will be effected at a temperature of about 210° C.

The reaction may be effected in any suitable manner and may comprise either a batch or a continuous type operation. For example, if a batch type operation is used a quantity of the desired material along with the desired catalytic agent which acts simultaneously as the diluent or solvent, is placed in an appropriate apparatus. The apparatus and contents thereof are then heated to the desired reaction temperature and maintained thereat for a predetermined period of time. During the reaction time any effluent which may distill over may be recovered and reused. At the end of this time the apparatus an contents thereof are allowed to cool to room temperature, and the polymeric product is recovered by filtration.

The reaction of the present invention may also be effected in a continuous type operation. When this type is used the ester of the acetoxy benzoic acid or substituted hydroxy benzoic acid is continuously charged to a reactor which may be maintained at the proper operating conditions of temperature and pressure. The organic compound which acts simultaneously as the catalytic agent and the solvent is also continuously charged to the reactor through a separate line, or if so desired, it may be admixed with the starting material and charged to the reactor in a single stream. The reactor may comprise an unpacked vessel or coil or may be lined with an adsorbent packing material such as alumina, fire brick, dehydrated bauxite, or the like. At the end of the required residence time the solution is continuously withdrawn, cooled, the reaction product filtered and the filtrate recycled to form a portion of the feed stock.

The following examples are given to illustrate the process of the present invention which, however, are not intended to limit the generally broad scope of the present invention in strict accordance therewith.

*Example I*

A mixture of 30 g. of the methyl ester of p-acetoxy benzoic acid dissolved in 100 g. of tri-N-butyl-amine was refluxed at a temperature of about 208° C. for a period of about 16 hours. During this time methyl acetate was distilled off. Upon completion of the residence time the reaction mixture was cooled and the polymer was filtered. The tri-N-butylamine filtrate when evaporated in vacuum will yield additional product. The polymer was washed with ether, acetone, benzene and carbon tetrachloride. The desired polymeric product comprised a white powder which was insoluble in dimethyl sulfoxide, guaiacol, dibutylphthalate and dimethylformamide. A melting point determination of the powder disclosed a melting point of approximately 450° C.

*Example II*

In this example a solution of 30 g. of tetrachloro-p-acetoxy methylbenzoate dissolved in 100 g. of N,N-dimethyl naphthylamine is refluxed at a temperature of about 270° C. for a period of about 16 hours. At the end of this time the reaction mixture is cooled, the product filtered and the tri-N-butylamine is evaporated in vacuum. The desired polymeric product comprising a powder is recovered and subjected to melting point determinations, the powder having a melting point above 450° C.

*Example III*

In this example 30 g. of tetrafluoro-p-acetoxy methylbenzoate dissolved in 100 g. of N,N-dipropyl aniline is treated in a manner similar to that set forth in the above examples, that is, by refluxing at a temperature of about 245° C. for 16 hours. The desired polymeric product, after cooling, is separated and recovered.

*Example IV*

In this experiment 30 g. of the ethyl ester of p-acetoxy benzoic acid is dissolved in 100 g. of N,(N-diethyl aniline and refluxed at a temperature of about 210° C. for a period of 16 hours. At the end of this time the polymeric product comprising a white powder is separated by conventional means and recovered.

I claim as my invention:

1. A process for the production of a polymeric product which comprises polymerizing an organic acid selected from the group consisting of hydroxy benzoic acid and alkyl esters of acetoxy benzoic acids in the presence of a tertiary amine having a boiling point greater than 150° C. in sufficient amount to act simultaneously as a polymerization catalyst and a solvent.

2. A process for the production of a polymeric product which comprises polymerizing an organic acid selected from the group consisting of hydroxy benzoic acid and alkyl esters of acetoxy benzoic acids in the presence of tri-N-butylamine in sufficient amount to act simultaneously as a polymerization catalyst and a solvent at a temperature in the range of from about 150° to about 300° C. to form the desired polymeric product.

3. A process for the production of a polymeric product which comprises polymerizing an organic acid selected from the group consisting of hydroxy benzoic acid and alkyl esters of acetoxy benzoic acids in the presence of N,N-dimethyl aniline in sufficient amount to act simultaneously as a polymerization catalyst and a solvent at a temperature in the range of about 150° to about 300° C. to form the desired polymeric product.

4. A process for the production of a polymeric product which comprises polymerizing an organic acid selected from the group consisting of hydroxy benzoic acid and alkyl esters of acetoxy benzoic acids in the presence of N,N-dimethyl naphthylamine in sufficient amount to act simultaneously as a polymerization catalyst and a solvent at a temperature in the range of from about 150° to about 300° C. to form the desired polymeric product.

5. A process for the production of a polymeric product which comprises polymerizing an organic acid selected from the group consisting of hydroxy benzoic acid and alkyl esters of acetoxy benzoic acids in the presence of N,N-dipropyl aniline in sufficient amount to act simultaneously as a polymerization catalyst and a solvent at a temperature in the range of from about 150° to about 300° C. to form the desired polymeric product.

6. A process for the production of a polymeric product which comprises polymerizing the methyl ester of p-acetoxy benzoic acid in a tertiary amine having a boiling point greater than 150° C., said amine being in sufficient amount to act simultaneously as a polymerization catalyst and a solvent, at a temperature in the range of from about 150° to about 300° C. to form the desired polymeric product.

7. A process for the production of a polymeric product which comprises polymerizing the ethyl ester of p-acetoxy benzoic acid in a tertiary amine having a boiling point greater than 150° C., said amine being in sufficient amount to act simultaneously as a polymerization catalyst and a solvent, at a temperature in the range of from about 150° to about 300° C. to form the desired polymeric product.

8. A process for the production of a polymeric product which comprises polymerizing tetrachloro-p-acetoxymethylbenzoate in a tertiary amine having a boiling point greater than 150° C., said amine being in sufficient amount to act simultaneously as a polymerization catalyst and a solvent, at a temperature in the range of from about 150° to about 300° C. to form the desired polymeric product.

9. A process for the production of a polymeric product which comprises polymerizing tetrafluoro-p-acetoxy methylbenzoate in a tertiary amine having a boiling point greater than 150° C., said amine being in sufficient amount to act simultaneously as a polymerization catalyst and a solvent, at a temperature in the range of from about 150° to about 300° C. to form the desired polymeric product.

10. A process for the production of a polymeric product which comprises polymerizing the methyl ester of p-acetoxy benzoic acid in a sufficient amount of tri-n-butylamine to act simultaneously as a polymerization catalyst and a solvent at a temperature in the range of from about 200° to about 225° C. to form the desired polymeric product.

11. A process for the production of a polymeric product which comprises polymerizing the ethyl ester of p-acetoxy benzoic acid in a sufficient amount of N,N-diethyl aniline to act simultaneously as a polymerization catalyst and a solvent at a temperature in the range of from about 210° to about 225° C. to form the desired polymeric product.

12. A process for the production of a polymeric product which comprises polymerizing tetrachloro-p-acetoxymethylbenzoate in the presence of sufficient N,N-dimethyl naphthyl amine to act simultaneously as a polymerization catalyst and a solvent at a temperature in the range of from about 270° to about 290° C. to form the desired polymeric product.

13. A process for the production of a polymeric product which comprises polymerizing tetrafluoro-p-acetoxy methylbenzoate in the presence of sufficient N,N-dipropylaniline to act simultaneously as a polymerization catalyst and a solvent at a temperature in the range of from about 240° to about 250° C. to form the desired polymeric product.

References Cited in the file of this patent

UNITED STATES PATENTS

| | | |
|---|---|---|
| 2,471,023 | Cook et al. | May 24, 1949 |
| 2,600,376 | Caldwell | June 17, 1952 |